United States Patent [19]

Chakrabarti et al.

[11] Patent Number: 5,747,135
[45] Date of Patent: May 5, 1998

[54] THIN FILM PRETREATMENT FOR MEMORY DISKS AND ASSOCIATED METHODS

[75] Inventors: Dhruba J. Chakrabarti; Richard A. Hoffman, both of Export; Craig L. Jensen, Pittsburgh, all of Pa.

[73] Assignee: Aluminum Company of America, Pittsburgh, Pa.

[21] Appl. No.: 569,344

[22] Filed: Dec. 8, 1995

[51] Int. Cl.$^6$ .................................................. B32B 3/00
[52] U.S. Cl. .................. 428/64.1; 428/64.2; 428/64.3; 428/694 R; 428/694 ML; 428/694 T; 428/913
[58] Field of Search ........................ 428/64.1, 64.2, 428/64.3, 457, 913, 694 R, 694 ML, 694 T, 694 ST, 688, 689, 697, 699

[56] References Cited

U.S. PATENT DOCUMENTS

| | | | |
|---|---|---|---|
| 3,619,181 | 11/1971 | Willey | 75/138 |
| 4,079,169 | 3/1978 | Nigh et al. | 428/636 |
| 4,224,381 | 9/1980 | Patel et al. | 428/652 |
| 4,552,820 | 11/1985 | Lin et al. | 428/611 |
| 4,699,672 | 10/1987 | Westerman | 148/12.7 |
| 4,722,872 | 2/1988 | Westerman | 428/654 |
| 4,751,958 | 6/1988 | Flowers et al. | 164/473 |
| 4,825,680 | 5/1989 | Coe et al. | 72/359 |
| 4,842,917 | 6/1989 | Ohno et al. | 428/141 |
| 4,889,767 | 12/1989 | Yokoyama et al. | 428/336 |
| 4,898,774 | 2/1990 | Yamashita et al. | 428/336 |
| 5,209,835 | 5/1993 | Makino et al. | 204/192.16 |
| 5,211,910 | 5/1993 | Pickens et al. | 420/532 |

*Primary Examiner*—Elizabeth Evans
*Attorney, Agent, or Firm*—David V. Radack; Gary P. Topolosky

[57] ABSTRACT

A memory media-ready substrate having a substrate, a hardening layer and a film made of a nonferromagnetic material that is disposed between the substrate and the film. A memory disk including the film and associated methods of making a hardening layer-ready substrate, the memory media-ready substrate and the memory disk are also provided.

65 Claims, 5 Drawing Sheets

THIN FILM PRETREATMENT FOR MEMORY DISKS AND ASSOCIATED METHODS

BACKGROUND OF THE INVENTION

This invention relates to a thin film pretreatment for a memory disk and associated methods, and more particularly to a memory media-ready substrate and a memory disk and associated methods of making a hardening layer-ready substrate, a memory media-ready substrate and a memory disk.

Memory disks, or read/write disks, are used for hard drives of computers. Present manufacturing processes for making memory disks involve electroless plating a hard nickel-phosphorous (Ni-P) layer on an aluminum substrate followed by deposition of a magnetic media layer and then application of a protective overcoat onto the magnetic media layer. The Ni-P layer is necessary to impart the required hardness in the memory disk. However, because the Ni-P layer cannot be plated directly onto a bare aluminum substrate, a thin zinc compound layer is applied between the substrate and this Ni-P layer. In order for the zinc compound layer to be applied, an aggressive chemical pretreatment is also necessary. This chemical pretreatment and "zincating" step result in roughening the substrate surface. The roughening necessitates applying a thicker layer of Ni-P to the substrate and then polishing said layer to produce a smooth Ni-P surface which is ready to receive the magnetic media layer. Plating of the thicker Ni-P layer and the subsequent polishing add to the cost of producing the memory disk. The chemical pretreatment steps of zincating also involve toxic chemicals which must be properly handled and disposed of. Such handling adds to the cost of producing memory disks.

What is needed is a memory disk substrate and memory disk that has superior qualities to the memory disk substrates and memory disks made by known processes and also a method of making memory disk substrates that eliminates the need for zincating and chemical pretreatment.

SUMMARY OF THE INVENTION

The invention has met or exceeded the above-mentioned needs as well as others. A memory media-ready substrate is provided which comprises a substrate, a hardening layer and a film made of a nonferromagnetic material disposed between the substrate and the hardening layer. The nonferromagnetic material is preferably a nickel-base alloy and more preferably a nickel-molybdenum, nickel-vanadium or nickel-tungsten alloy. A memory disk including the memory media-ready substrate is also provided.

The associated method of this invention involves a process of making a hardening layer-ready substrate comprising providing a substrate and depositing thereon a film of nonferromagnetic material that can bond to the substrate. Again, the nonferromagnetic material is preferably a nickel-base alloy and more preferably a nickel-molybdenum, nickel-vanadium or nickel-tungsten alloy. Methods of making a memory media-ready substrate and a method of making a memory disk is also provided.

BRIEF DESCRIPTION OF THE DRAWING

A full understanding of the invention can be gained from the following detailed description of the invention when read in conjunction with the accompanying drawings in which.

2

DETAILED DESCRIPTION

Figure 1:
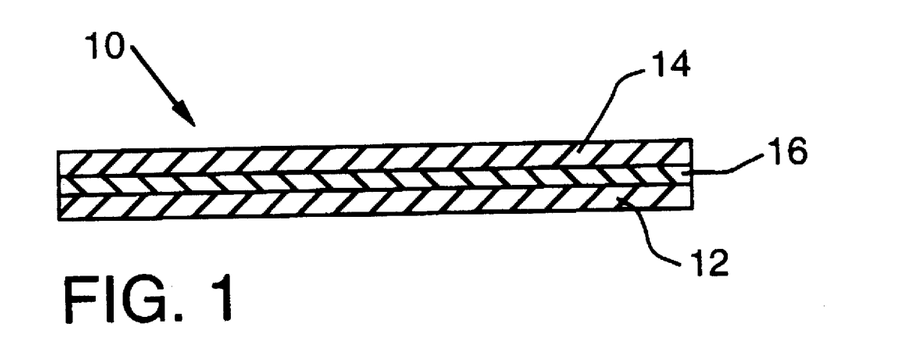
FIG. 1 is a detailed, magnified cross-sectional view of the memory media-ready substrate of the invention.

Referring now more particularly to FIG. 1, a detailed, magnified cross-sectional view of a memory media-ready substrate 10 of the invention is shown. The memory media-ready substrate 10 includes a substrate 12 and a hardening layer 14. Interposed between the substrate 12 and the hardening layer 14 is the film 16 of the invention. The substrate 12 is conventionally made of aluminum, such as aluminum alloy designation 5086 (Aluminum Association) but can also be made of other aluminum alloys and even ceramics. For other aluminum alloy compositions that can be used as the substrate, see commonly owned U.S. patent application Ser. No. 08/465,284, the disclosure of which is incorporated herein by reference. The substrate is typically 0.025 to 0.080 inches in thickness and is generally circular in shape having a diameter of about 65 mm to 130 mm.

The film 16 is applied to the substrate in order to bond the hardening layer 14 to the substrate 12. This film 16 replaces the need for the prior art zincating process, as described above. The thin film 16 is deposited to a thickness of about 100–2000 Å (Angstroms) with the preferred thickness being about 750–1000 Å. The film 16 is a nonferromagnetic material, because a ferromagnetic material would interfere with the memory media subsequently applied to the substrate 10 to make the memory disk as discussed below. By "nonferromagnetic" it is meant a material that is not ferromagnetic and also exhibits the absence of the following characteristics (i) hysteresis loop width and (ii) magnetic saturation. The nonferromagnetic material is preferably a nickel-base alloy and more preferably a nickel-molybdenum (Ni-Mo), nickel-vanadium (Ni-V) or nickel-tungsten (Ni-W) alloy although it will be appreciated that other alloying elements such as Ti, Cr, Mn, Cu, Zn, Al, Si, Zr, Nb, Ag, Hf, Ta, and Au can be used. The nickel-base alloy should contain a minimum amount of Mo, V or W in order to make the nonferromagnetic film and avoid magnetic interaction with the subsequently applied magnetic media layer. On the other hand, too much Mo, V or W reduces the ability of the film 16 to bond with Ni-P hardening layer (see below) because of nickel's affinity for nickel-base alloys. With these end points in mind, we have found that the Ni-Mo alloy has preferably between about 7 to 15 wt % and more preferably about 9 to 11 wt % molybdenum; the Ni-V alloy has preferably between about 3 to 10 wt % and more preferably about 5 to 9 wt % vanadium; and the Ni-W alloy has preferably between about 15 to 20 wt % and more preferably about 16 to 18 wt % tungsten.

The film 16 can be deposited on the substrate 12 by any number of methods known by those skilled in the art. One such method involves sputtering wherein the substrate 12 and a source material (such as Ni-W) are placed in a vacuum chamber. The source material is maintained at a high potential relative to the substrate 12. Argon gas (at less than atmospheric pressure) is then introduced into the vacuum chamber. As this argon gas ionizes and collides with the source material, atoms of the source material are knocked away from the source material and deposit onto the substrate.

The film 16 can also be vacuum deposited onto the substrate 12 and a source material (for example Ni-W) are placed in a vacuum chamber. The source material is heated above its melting point using a focused beam of electrons from an electron gun. When the temperature of the source is high enough, atoms evaporate from the source and deposit on the substrate thus forming a film.

It will be appreciated that before depositing film 16 onto the substrate 12, the substrate 12 can be pretreated by sputter etching, oxygen plasma cleaning and/or vapor degreasing. Sputter etching involves bombarding the surface of the substrate 12 with inert gas ions (usually argon) to sputter material from the surface thus cleaning it prior to film deposition. This is usually done in the film deposition chamber and involves placing the substrate on an electrode in the case of sputter deposition or the use of an ion gun in the case of vacuum evaporation. In oxygen plasma cleaning, the substrate 12 is placed in a vacuum chamber which is then partially evacuated and backfilled with oxygen gas at a reduced pressure. An oxygen plasma is created by applying a high electrical potential to a set of electrodes and oxygen radicals from the plasma react with organic contaminants on the substrate, the by-products of which are then pumped away. Thus organic contaminants are removed from the substrate surface. In vapor degreasing, the substrate 12 is placed above a heated bath of an organic solvent (for example, trichloroethane). Vapors from the solvent condense on the substrate and react with organic contaminants thus removing them leaving the substrate free of organic contaminants.

Once the film 16 has been deposited on the substrate 12, the hardening layer 14 is readied for application onto the film 16. As explained above, the hardening layer 14 is needed in order to impart surface hardness to the memory disk. The hardening layer 14 is conventionally made of nickel-phosphorous material (Ni-P). Prior art Ni-P layers were between about 12 to 20 microns in thickness and then polished to about 10 microns in thickness. The Ni-P hardening layer 14 of the invention is between 10 to 20 microns in thickness with 11 to 16 microns being preferred and with 11 to 12 microns being most preferred. Hardening layer 14 is applied to film 16 by an electroless plating method.

In accordance with the invention, after the hardening layer 14 is applied to the film 16, the memory media-ready substrate 10 is annealed at one or more temperatures between about 250° F. to 350° F. for about ½ to 5 hours and preferably about 280° F. to 320° F. for about 1 to 4 hours. This is done by placing the memory media-ready substrate in an annealing oven. Annealing helps in relieving the residual stress in the film generated during sputter deposition and plating. This in turn reduces the spalling tendency of the film and improves adherence to the adjacent layers.

Figure 2:
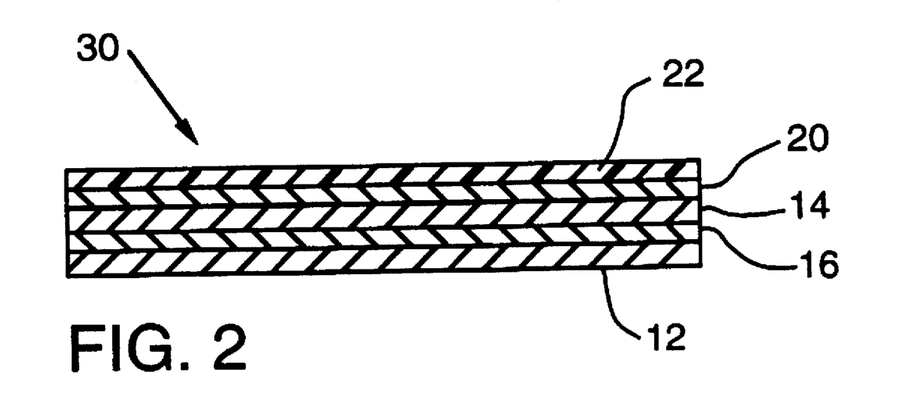
FIG. 2 is a detailed, magnified cross-sectional view of a memory disk of the invention.

After annealing, a magnetic media layer 20 is applied to the hardening layer 14. Referring to FIG. 2, the magnetic media layer 20 is conventionally a ferromagnetic material such as alloys of cobalt, nickel or iron with one or more alloying elements such as chromium, platinum, tantalum or other elements with similar characteristics known to those skilled in the art. The media 20 is applied by sputtering, for example, to a thickness of about 400 Å to 500 Å. Thereafter, an overcoat 22 is preferably applied to the magnetic recording media for protecting the media. The overcoat 22 is also applied by sputtering, for example, to a thickness of about 200 Å to 300 Å. FIG. 2 shows a complete memory disk 30.

EXAMPLE 1

Four substrates of aluminum alloy 5086 (Aluminum Association designation) were first vapor degreased and then placed into a Bosch Engineering Sputtering Unit. Each substrate was then sputter etched for a total of 10 minutes. Then, a thin film layer of Ni—9.4 wt % Mo was sputtered onto each of the substrates to a thickness of 750 Å. The four hardening layer-ready substrates were removed from the sputtering unit. One of the hardening layer-ready substrates was then subjected to a well known industry test. In this test, a piece of adhesive tape is adhered to the hardening-layer ready substrate and then subsequently removed. In this test, none of the film layer was removed from the hardening-layer ready substrate by the piece of adhesive tape, thus indicating that the thin layer of Ni-Mo was well bonded to the substrate.

The remaining three substrates were then coated with a thin Ni-P layer to form a memory media substrate. This was accomplished by dipping each of the three substrates into a receptacle containing the Ni-P solution. The Ni-P layer was deposited thereon approximately 16 microns thick. One of these memory media-ready substrates was taken aside and again subjected to the aforementioned adhesive tape test. In this test, none of the Ni-P layer was removed by the adhesive tape indicating that the Ni-P layer was well bonded to the thin layer of Ni-Mo. This same memory media-ready substrate was then subjected to a 180° bend disk adhesion test (hereinafter "bend adhesion test") , another well known test in the memory disk art. According to that test, the memory media-ready substrate is first folded in half and the areas surrounding the fold line are observed to see if the Ni-P layer cracks or crazes. The memory media-ready substrate subjected to this bend adhesion test showed no detrimental crazing or significant blistering on the folded surface or at its edges, thereby by passing this test.

The remaining two memory media-ready substrates were furnace annealed at about 300° F. for about 2 hours. The two annealed memory media-ready disks were then subjected to the bend adhesion test. The results of this test showed further improvement in bend adhesion performance over the non-annealed substrate as evidenced by the elimination of any traces of blistering.

Figure 3:
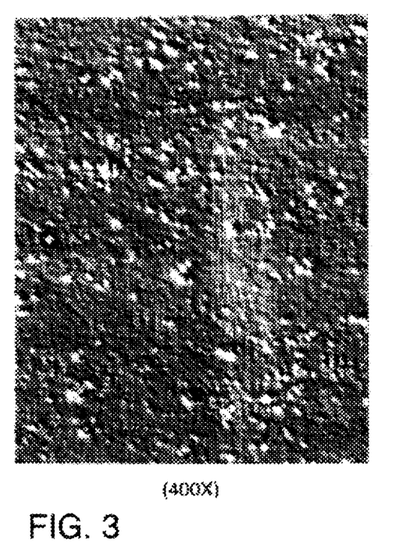
FIG. 3 is an optical micrograph (400X) of a sample of a nickel-phosphorous plated substrate using the known zincating pretreatment.
Figure 4:
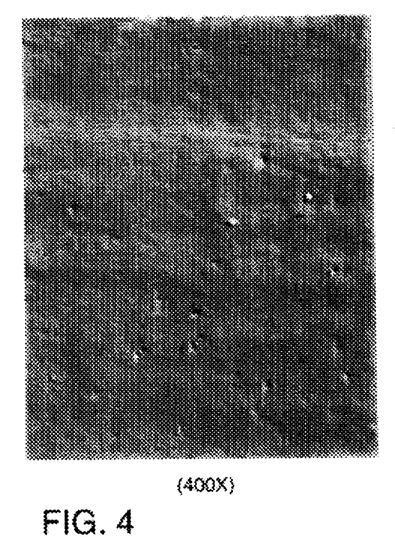
FIG. 4 is an optical micrograph (400X) of a sample of a nickel-phosphorous plated substrate having a Ni—9.4 wt % Mo film of the invention.

Referring to FIGS. 3 and 4, optical micrographs show the difference between a substrate made by a prior art process (FIG. 3) and a substrate made by the process of the invention (FIG. 4). The substrate of FIG. 4 is specular and smooth, requiring little or no polishing as opposed to the substrate of FIG. 3, which is mottled and dull, requiring considerable polishing.

Figure 5:
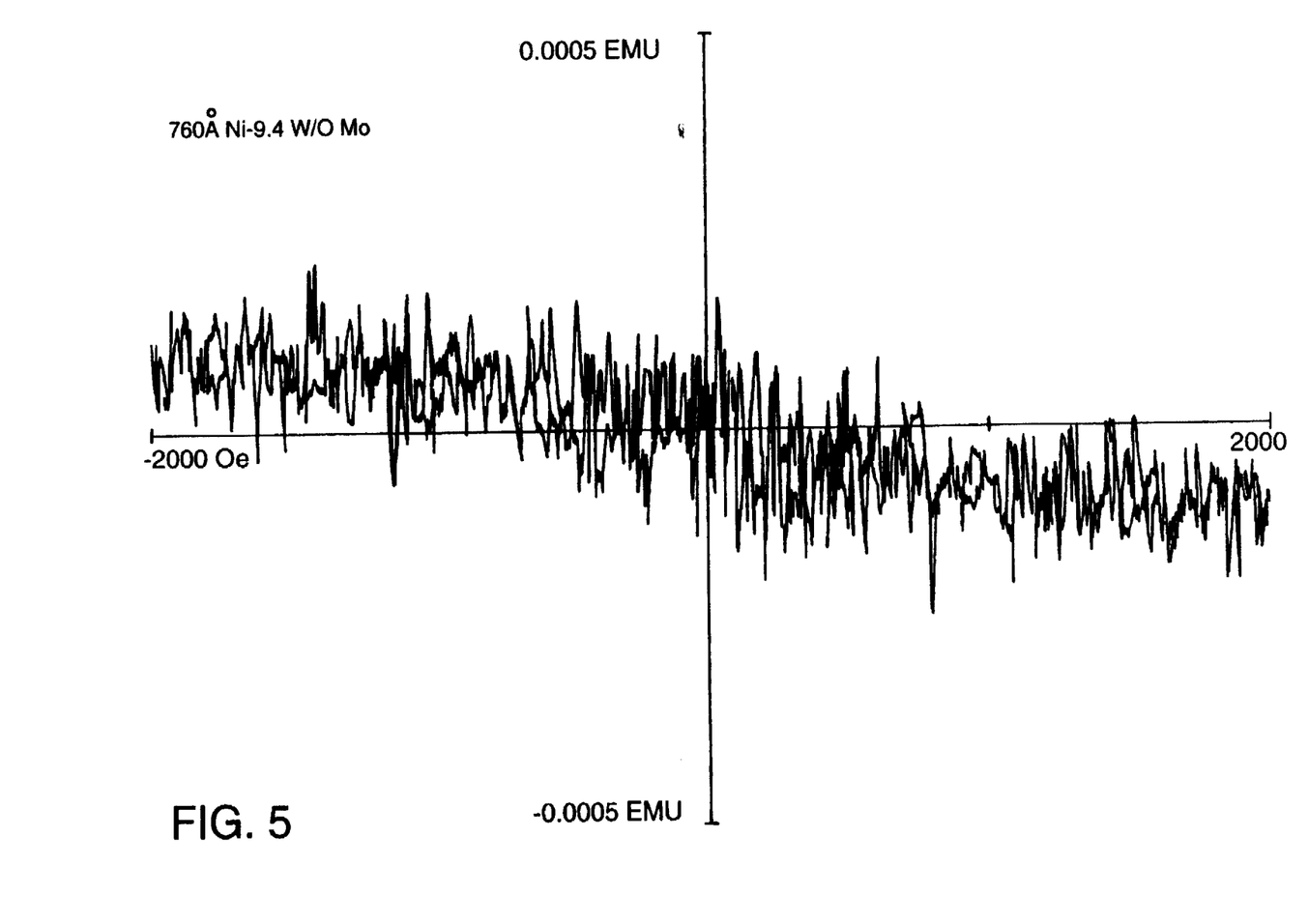
FIG. 5 is a hysteresis loop trace for determining the existence of ferromagnetism using a vibrating sample magnetometer for a substrate having a Ni - 9.4 wt % Mo film of the invention.

Referring to FIG. 5, magnetization of a 760 Å Ni—9.4 wt % Mo substrate was measured through a complete cycle of magnetic field from −2000 Oe to +2000 Oe in a vibrating sample magnetometer. The absence of any hysteresis loop and magnetic saturation confirms that the film is nonferromagnetic. The large scatter in the data arises because of very low magnetization of this film. This graph shows that the Ni—9.4 wt % Mo composition is magnetically acceptable for film 16.

EXAMPLE 2

Three substrates of aluminum alloy 5086 (Aluminum Association designation) were vapor degreased and then placed into a Bosch Engineering Sputtering Unit. Once in the sputtering unit, the substrates were sputter etched for a total of 10 minutes. Then a thin film layer of Ni—8.4 wt % V was sputtered onto the substrates to a thickness of 1000 Å. The three hardening layer-ready substrates were removed from the sputtering unit. One of the removed substrates were subjected to the adhesive tape test. None of the film layer was removed from the hardening layer-ready substrate by the piece of adhesive tape.

The remaining two hardening layer-ready substrates were then coated with a Ni-P layer to form a memory media-ready substrate. This was accomplished by dipping each of the two substrates into a receptacle containing the Ni-P solution. The Ni-P layer was approximately 16 microns in thickness. One of these memory media-ready substrates was taken aside and again subjected to the adhesive tape test. In this test, none of the Ni-P layer was removed by adhesive tape indicating that the Ni-P layer was well bonded to the thin layer of Ni-V. This same memory media-ready substrate was then subjected to the bend adhesion test. The results of this test showed an almost perfect surface with some small craze marks.

The remaining memory-ready substrate was annealed in a furnace at about 300° F. for about 2 hours. The annealed memory media-ready disks were then subjected to the bend adhesion test and showed no defects.

Figure 6:
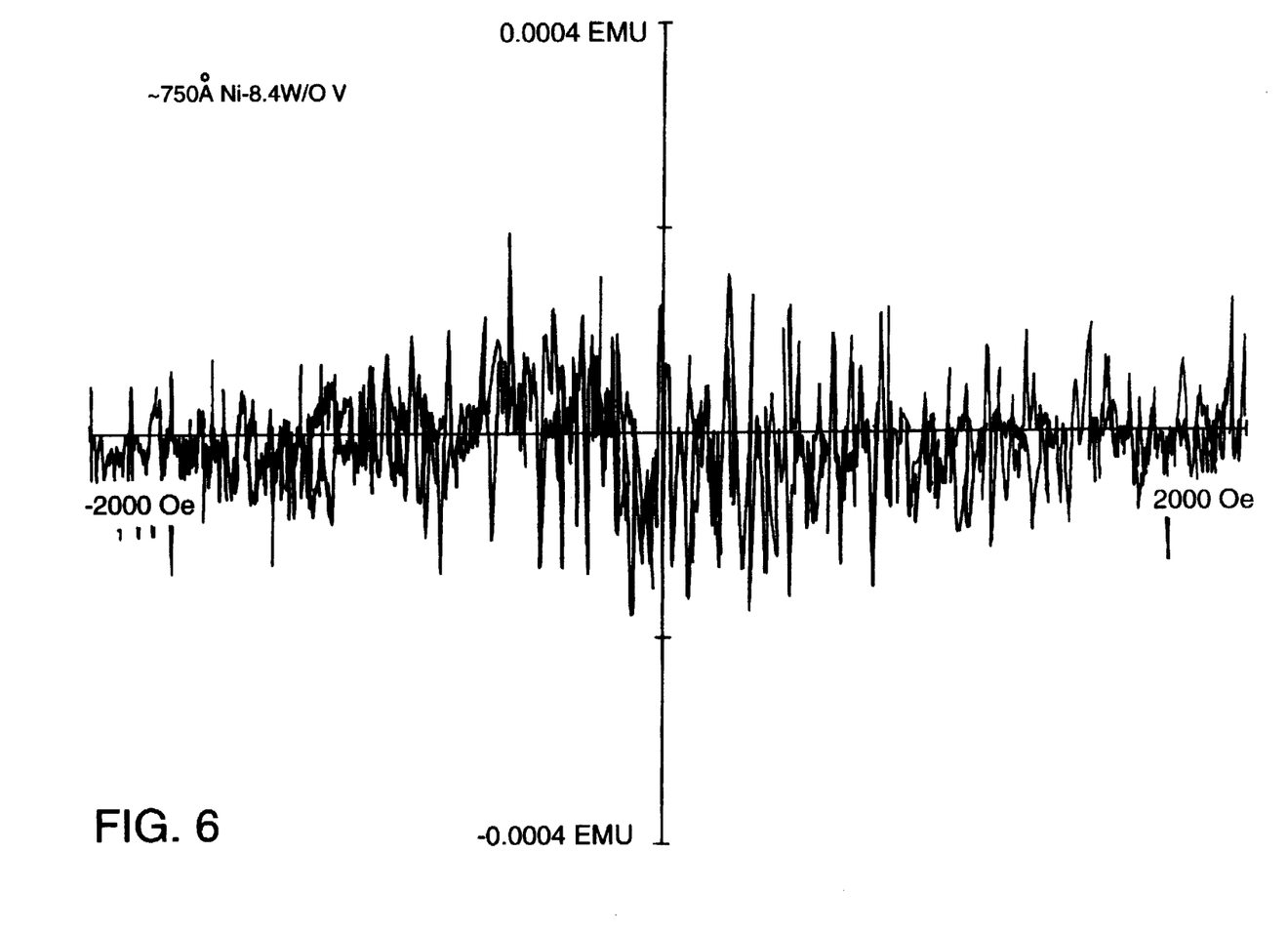
FIG. 6 is a hysteresis loop trace for determining the existence of ferromagnetism using a vibrating sample magnetometer for a substrate having a Ni - 8.4 wt % V film of the invention.

Referring to FIG. 6, the magnetization of a 750 Å Ni—8.4 wt % V substrate was measured through a complete cycle of magnetic field from −2000 Oe to +2000 Oe in a vibrating sample magnetometer. The absence of any hysteresis loop and magnetic saturation confirms that the film is nonferromagnetic. The large scatter in the data arises because of very low magnetization of this film. This graph shows that the Ni—8.4 wt % V composition is magnetically acceptable for the underlayer film 16.

EXAMPLE 3

Three substrates of aluminum alloy 5086 (Aluminum Association designation) were vapor degreased and then placed into a Bosch Engineering Sputtering Unit. Once in the sputtering unit, the substrates were sputter etched for a total of 10 minutes. Then a thin film layer of Ni—16 wt % W was sputtered onto the substrates to a thickness of 1000 Å. The three hardening layer-ready substrates were removed from the sputtering unit. One of the removed substrates was subjected to the adhesive tape test. None of the film layer was removed from the hardening layer-ready substrate by the piece of adhesive tape.

The remaining two hardening layer-ready substrates were then coated with a Ni-P layer to form a memory media-ready substrate. This was accomplished by dipping each of the two substrates into a receptacle containing the Ni-P solution. The Ni-P layer was approximately 16 microns in thickness. One of these memory media-ready substrates was taken aside and again subject to the adhesive tape test. In this test, none of the Ni-P layer was removed by adhesive tape indicating that the Ni-P layer was well bonded to the thin layer of Ni-W. This same memory media-ready substrate was then subjected to the bend adhesion test. The results of this test showed no detrimental crazing or blistering on the folded surface or at its edges.

The remaining memory-ready substrate was then annealed in a furnace at about 300° F. for about 2 hours. The annealed memory media-ready disks were then subject to the bend adhesion test and also showed no defects.

Figure 7:
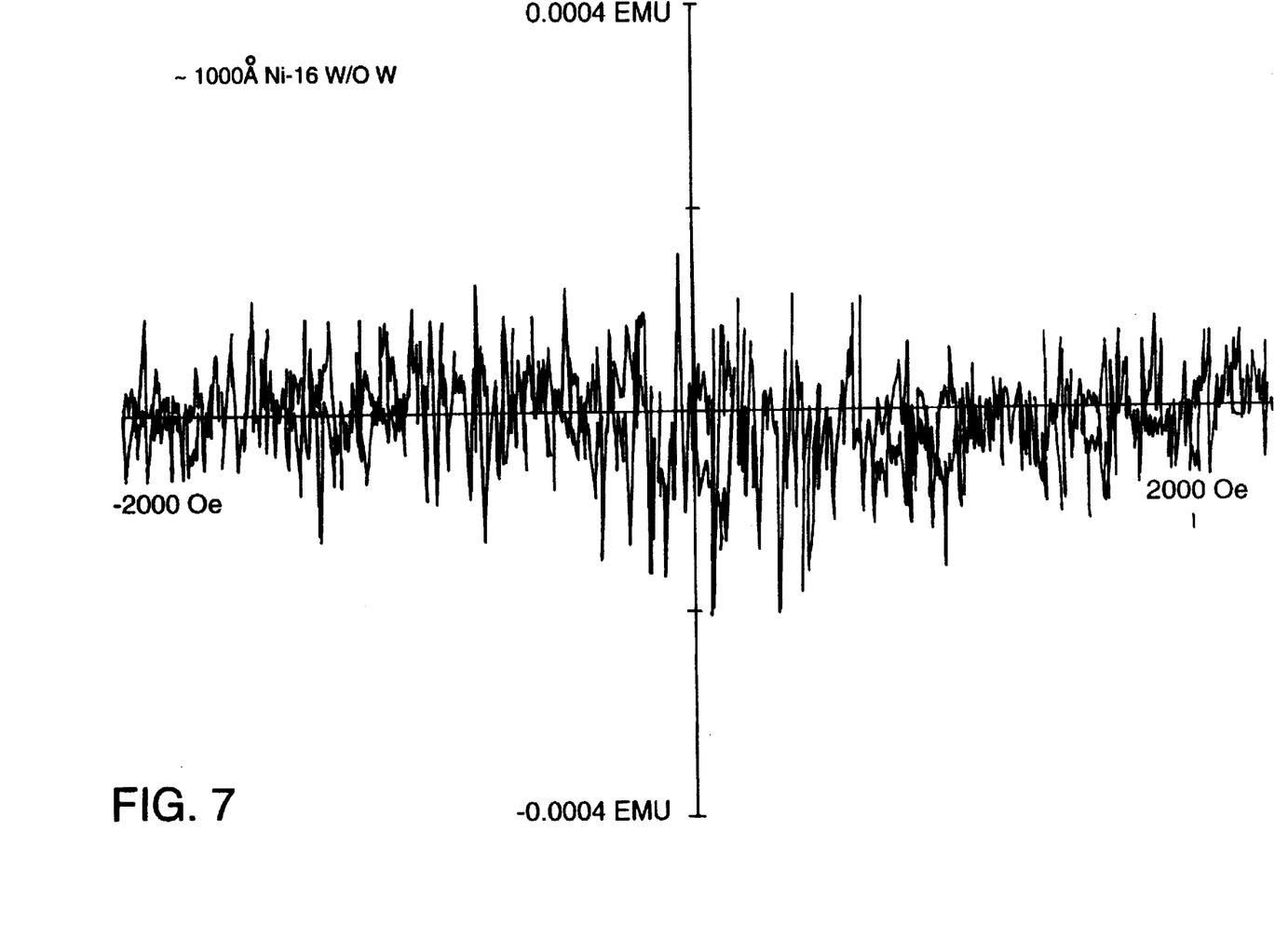
FIG. 7 is a hysteresis loop trace for determining the existence of ferromagnetism using a vibrating sample magnetometer for a substrate having a Ni—16 wt % W film of the invention.

Referring to FIG. 7, magnetization of a 1000 Å Ni—16 wt % W substrate was measured through a complete cycle of magnetic field from −2000 oe to +2000 oe in a vibrating sample magnetometer. The absence of any hysteresis loop and magnetic saturation confirms that the film is nonferromagnetic. The large scatter in the data arises because of very low magnetization of this film. This graph shows that the Ni—16 wt % W composition is magnetically acceptable for the underlayer film 16.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A memory media-ready substrate comprising:

a substrate;

a nickel-phosphorous hardening layer; and a film made of nonferromagnetic material, said film being disposed between said substrate and said hardening layer.

2. The memory media-ready substrate of claim 1, wherein said nonferromagnetic material is a nickel-base alloy.

3. The memory media-ready substrate of claim 2, wherein said nickel-base alloy includes about 7 to 15 wt. % molybdenum.

4. The memory media-ready substrate of claim 3, wherein said nickel-base alloy has between about 9 to 11 wt % molybdenum.

5. The memory media-ready substrate of claim 2, wherein said nickel-base alloy includes about 3 to 10 wt. % vanadium.

6. The memory media-ready substrate of claim 5, wherein said nickel-base alloy has between about 5 to 9 wt % vanadium.

7. The memory media-ready substrate of claim 2, wherein said nickel-base alloy includes about 15 to 20 wt. % tungsten.

8. The memory media-ready substrate of claim 7, wherein said nickel-base alloy has between about 16 to 18 wt % tungsten.

9. The memory media-ready substrate of claim 1, wherein said film has a thickness of between about 100 to 2000 Å.

10. The memory media-ready substrate of claim 9, wherein said film has a thickness of between about 750 to 1000 Å.

11. A memory disk comprising:

a substrate;

a film made of a nonferromagnetic material on said substrate;

a nickel-phosphorous hardening layer on said film;

a magnetic media layer on said hardening layer; and an overcoat applied on said magnetic media layer.

12. The memory disk of claim 11, wherein
said nonferromagnetic material is a nickel-base alloy.

13. The memory disk of claim 12, wherein
said nickel-base alloy includes about 7 to 15 wt. % molybdenum.

14. The memory disk of claim 13, wherein
said nickel-base alloy has between about 9 to 11 wt % molybdenum.

15. The memory disk of claim 12, wherein
said nickel-base alloy includes about 3 to 10 wt. % vanadium.

16. The memory disk of claim 15, wherein
said nickel-base alloy has between about 5 to 9 wt % vanadium.

17. The memory disk of claim 12, wherein
said nickel-base alloy includes about 15 to 20 wt. % tungsten.

18. The memory disk of claim 17, wherein
said nickel-base alloy has between about 16 to 18 wt % tungsten.

19. The memory disk of claim 11, wherein
said film has a thickness of between about 100 to 2000 Å.

20. The memory disk of claim 19, wherein
said film has a thickness of between about 750 to 1000 Å.

21. A method of making a nickel-phosphorous hardening layer-ready substrate comprising:
providing a substrate;
depositing on said substrate a film of nonferromagnetic material that can bond to said hardening layer; and
before depositing said film, sputter etching said substrate.

22. A method of making a nickel-phosphorous hardening layer-ready substrate comprising:
providing a substrate;
depositing on said substrate a film of nonferromagnetic material that can bond to said hardening layer; and
before depositing said film, oxygen plasma cleaning said substrate.

23. A method of making a nickel-phosphorous hardening layer-ready substrate comprising:
providing a substrate;
depositing on said substrate a film of nonferromagnetic material that can bond to said hardening layer; and
before depositing said film, vapor degreasing said substrate.

24. A method of making a nickel-phosphorous hardening layer-ready substrate comprising:
providing a substrate;
depositing on said substrate a film of nonferromagnetic material that can bond to said hardening layer;
employing as said nickel-base alloy one selected from the group consisting of nickel-molybdenum, nickel-vanadium and nickel-tungsten; and
employing a nickel-molybdenum alloy having between about 7 to 15 wt % molybdenum.

25. The method of claim 24, including
employing a nickel-molybdenum alloy having between about 9 to 11 wt % molybdenum.

26. A method of making a nickel-phosphorous hardening layer-ready substrate comprising:
providing a substrate;
depositing on said substrate a film of nonferromagnetic material that can bond to said hardening layer;
employing as said nonferromagnetic material a nickel-base alloy;
employing as said nickel-base alloy one selected from the group consisting of nickel-molybdenum, nickel-vanadium and nickel-tungsten; and
employing a nickel-tungsten alloy having between about 15 to 20 wt % tungsten.

27. The method of claim 26, including
employing a nickel-tungsten alloy having between about 16 to 18 wt % tungsten.

28. A method of making a nickel-phosphorous hardening layer-ready substrate comprising:
providing a substrate;
depositing on said substrate a film of nonferromagnetic material that can bond to said hardening layer; and
depositing said nonferromagnetic material to a thickness of between about 100 to 2000 Å.

29. The method of claim 28, including depositing said nonferromagnetic material to a thickness of between about 750 to 1000 Å.

30. A method of making a memory media-ready substrate, said method comprising:
providing a substrate;
depositing on said substrate a film of nonferromagnetic material; and
applying a nickel-phosphorous hardening layer on said film.

31. The method of claim 30, including
depositing said film by a method selected from the group consisting of sputtering and vacuum evaporation.

32. The method of claim 30, including before depositing said film, sputter etching said substrate.

33. The method of claim 30, including
before depositing said film, oxygen plasma cleaning said substrate.

34. The method of claim 30, including
before depositing said film, vapor degreasing said substrate.

35. The method of claim 30, including
employing as said nonferromagnetic material a nickel-base alloy.

36. The method of claim 35, including
employing as said nickel-base alloy one selected from the group consisting of nickel-molybdenum, nickel-vanadium and nickel-tungsten.

37. The method of claim 36, including
employing a nickel-molybdenum alloy having between about 7 to 15 wt % molybdenum.

38. The method of claim 37, including
employing a nickel-molybdenum alloy having between about 9 to 11 wt % molybdenum.

39. The method of claim 36, including
employing a nickel-vanadium alloy having between about 3 to 10 wt % vanadium.

40. The method of claim 39, including
employing a nickel-vanadium alloy having between about 5 to 9 wt % vanadium.

41. The method of claim 36, including
employing a nickel-tungsten alloy having between about 15 to 20 wt % tungsten.

42. The method of claim 41, including
employing a nickel-tungsten alloy having between about 16 to 18 wt % tungsten.

43. The method of claim 30, including depositing said nonferromagnetic material to a thickness of between about 100 to 2000 Å.

44. The method of claim 43, including depositing said nonferromagnetic material to a thickness of between about 750 to 1000 Å.

45. The method of claim 30, including after applying said hardening layer, annealing said memory media-ready substrate.

46. The method of claim 45, including annealing said memory media-ready substrate at a temperature between about 250° F. to 350° F. for between about ½ to 5 hours.

47. The method of claim 46, including annealing said memory media-ready substrate at a temperature between about 280° F. to 320° F. for between about 1 to 4 hours.

48. A method of making a memory disk comprising:

providing a substrate;

depositing on said substrate a film of nonferromagnetic material;

applying a nickel-phosphorus hardening layer to said film to form a memory media-ready substrate;

annealing said memory media-ready substrate;

depositing a magnetic media layer on said annealed memory media-ready substrate; and applying an overcoat layer on said memory media layer.

49. The method of claim 48, including depositing said film by a method selected from the group consisting of sputtering and vacuum evaporation.

50. The method of claim 48, including before depositing said film, sputter etching said substrate.

51. The method of claim 48, including before depositing said film, oxygen plasma cleaning said substrate.

52. The method of claim 48, including before depositing said film, vapor degreasing said substrate.

53. The method of claim 48, including employing as said nonferromagnetic material a nickel-base alloy.

54. The method of claim 53, including employing as said nickel-base alloy one selected from the group consisting of nickel-molybdenum, nickel-vanadium and nickel-tungsten.

55. The method of claim 54, including employing a nickel-molybdenum alloy having between about 7 to 15 wt % molybdenum.

56. The method of claim 55, including employing a nickel-molybdenum alloy having between about 9 to 11 wt % molybdenum.

57. The method of claim 54, including employing a nickel-vanadium alloy having between about 3 to 10 wt % vanadium.

58. The method of claim 57, including employing a nickel-vanadium alloy having between about 5 to 9 wt % vanadium.

59. The method of claim 54, including employing a nickel-tungsten alloy having between about 15 to 20 wt % tungsten.

60. The method of claim 59, including employing a nickel-tungsten alloy having between about 16 to 18 wt % tungsten.

61. The method of claim 48, including depositing said nonferromagnetic material to a thickness of between about 100 to 2000 Å.

62. The method of claim 61, including depositing said nonferromagnetic material to a thickness of between about 750 to 1000 Å.

63. The method of claim 48, including after applying said hardening layer, annealing said memory media-ready substrate.

64. The method of claim 63, including annealing said memory media-ready substrate at a temperature of between about 250° F. to 350° F. for between about ½ to 5 hours.

65. The method of claim 64, including annealing said memory media-ready substrate at a temperature of between about 280° F. to 320° F. for between about 1 to 4 hours.

\* \* \* \* \*